No. 608,135. Patented July 26, 1898.
R. LUNDELL.
COMMUTATOR BRUSH HOLDER FOR DYNAMO ELECTRIC MACHINES.
(Application filed Feb. 4, 1898.)
(No Model.)

WITNESSES:
C. E. Ashley
N. W. Lloyd

INVENTOR:
Robert Lundell
By his Attorney
Charles J. Kintner

UNITED STATES PATENT OFFICE.

ROBERT LUNDELL, OF NEW YORK, N. Y., ASSIGNOR OF TWO-THIRDS TO THE INTERIOR CONDUIT AND INSULATION COMPANY, OF SAME PLACE.

COMMUTATOR-BRUSH HOLDER FOR DYNAMO-ELECTRIC MACHINES.

SPECIFICATION forming part of Letters Patent No. 608,135, dated July 26, 1898.

Application filed February 4, 1898. Serial No. 669,132. (No model.)

*To all whom it may concern:*

Be it known that I, ROBERT LUNDELL, a citizen of the United States, residing at New York, (Brooklyn,) in the county of Kings and State of New York, have made a new and useful invention in Commutator-Brush Holders and Brushes for Electric Motors or Dynamo-Electric Machines, of which the following is a specification, reference being had to the accompanying drawings.

My invention has for its object to produce a commutator-brush holder and brush or brushes therefor which shall avoid, as far as possible, the objectionable features attributable to existing types of such devices and which shall possess the following characteristics of utility: first, freedom from noise, such as chattering or squeaking, and the capacity of permitting the commutator to be rotated in either direction with equally good results under all conditions of usage; second, maximum current-carrying capacity during the entire life of the brush or brushes; third, freedom from heating usually attributable to loose contacts, frictional joints, or unequal wear of the brush-bearing surfaces on the commutator as it is fed forward; fourth, freedom from the wearing of ridges on the commutator-surface between the ends of adjacent brushes; fifth, the utilization of maximum surface of the commutator in the direction of the length of the strips thereof; sixth, adjustability as to tension and surface wear; seventh, adaptability to utilize at will either end of a novel commutator-brush provided with a centrally-located clamping slot or opening, and, eighth, to construct a brush-holder in which the clamping parts are made as light as possible, so as to prevent jumping of the carbon brushes held thereby in the event of the machine itself being subjected to vibration—as, for instance, is the case with railway-motors.

My invention will be fully understood by referring to the accompanying drawings, in which—

Figure 1:
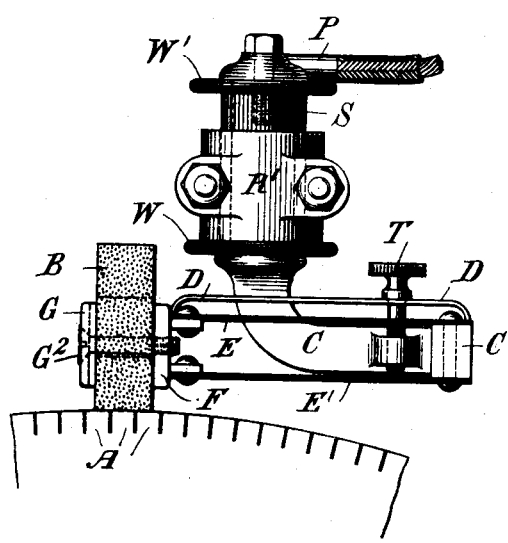
Figure 2:
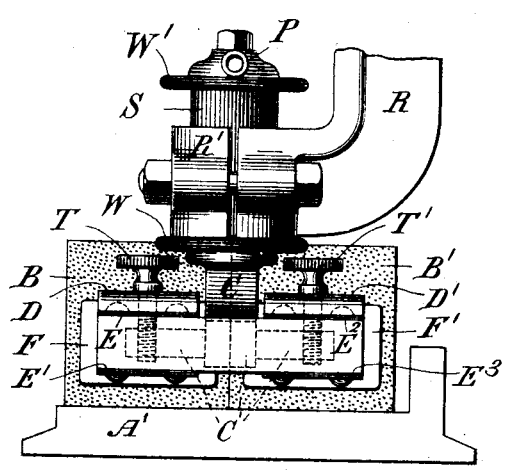
Figure 3:
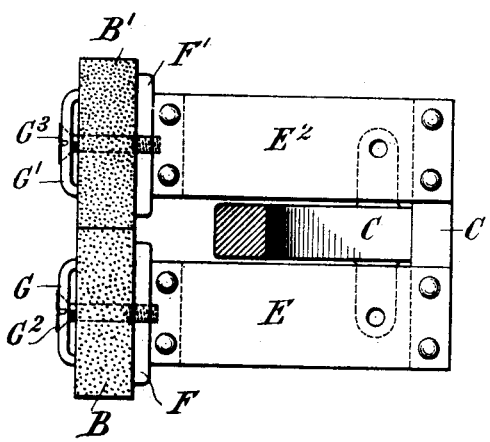
Figure 4:
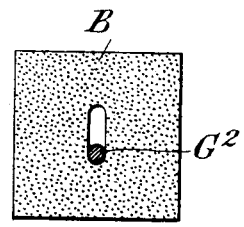

Figure 1 is an end elevational view of a part of the commutator of an electric motor or dynamo-electric machine, illustrating my novel brush-holder and brush therefor in side elevation. Fig. 2 is a side elevational view of my novel brush-holder and the brushes sustained thereby, showing also in side elevation a single commutator-strip upon which the brushes rest. Fig. 3 is a part plan, part sectional, view of my novel brush-holder and brushes; and Fig. 4, a detail side elevational view of one of the brushes, illustrating its central clamping slot or opening, the clamping-screw therefor being shown in sectional view.

Referring now to the drawings in detail, in all of which like letters of reference represent like parts wherever used, A represents the commutator of a motor or dynamo-electric machine, and $A'$ a single commutator-strip thereof, the latter being shown in side elevation in Fig. 2 to illustrate more clearly how my invention makes it possible to utilize a maximum surface of the commutator in the direction of the length of the strips thereof.

R is the rocker-arm, of well-known form for large dynamo-electric machines, and to which my novel brush-holder is adjustably secured by an L-shaped arm or stud C, vertical adjustability of the entire holder being effected by a clamp $R'$, secured to the rocker-arm by bolts, as shown, this feature of adjustment adapting the entire brush-holder to be moved vertically as the commutator wears away.

S is a sleeve of hard rubber, vulcanized fiber, or equivalent material, and W $W'$ washers of similar material for insulating the brush-holder in the usual manner from the rocker R and the frame of the machine, and P is a binding-post for the conductor running to the source of current use or supply. The lower and rear end of the arm or stud C has lateral extensions, to which are secured by rivets two pairs of copper brush-sustaining springs E $E'$ $E^2$ $E^3$, and to the forward or free ends of these springs are secured in a similar manner metallic conducting-blocks F $F'$, provided with screw-threaded holes adapted to receive clamping-screws $G^2$ $G^3$ for rigidly securing by clamps G and $G'$ adjacent brushes B $B'$, preferably of carbon or graphite, and having each a slot or opening through its center for receiving its clamping-screw, as more clearly shown in Fig. 4.

D and D' are adjusting-springs having holes for corresponding adjusting thumb-screws T T', the lower ends of which pass through screw-holes in additional side lugs on the arm or stud C. The opposite ends of the flat springs D and D' rest, respectively, upon the ends of the side lugs which support the springs E E' $E^2$ $E^3$ and free ends of the springs E $E^2$, the function of said springs D D' and thumb-screws T T' being to compensate or adjust for tension and wear of the brushes.

The operation of my novel brush-holder is obvious in view of the structure described, it being apparent that by virtue of the pairs of springs E E' and $E^2$ $E^3$, their supported conducting-blocks F F', clamps G G', and clamping-screws $G^2$ $G^3$ the adjacent carbon brushes B and B' will be held firmly, so that they abut always against each other laterally, and hence never permit of any possibility of ridges being worn on the commutator between them, as is now possible with existing double brushes yieldingly supported. It is also obvious that my novel form of brush with its central sustaining-opening makes it possible to utilize a maximum surface of the commutator in the direction of the length of the commutator-strips, there being no side or lateral supports for the brush. It will also be seen that the two pairs of sustaining-springs E E' $E^2$ $E^3$ by means of their parallelism, the parallel adjustability of their supporting-stud C, and the parallel adjustability of the brushes B B' will always cause said brushes to move in a plane parallel with their starting positions, so that they will always bear with their entire end surfaces against the commutator as they or the commutator are worn away, thus affording a constancy of action not attainable by any brush-holder known to me.

Having thus described my invention, what I claim, and desire to secure by Letters Patent of the United States, is—

1. A brush-holder having adjacent brushes rigidly clamped against conducting pieces or blocks which permit them to abut against each other, said conducting-blocks in turn being securely fastened to an arm or stud by means of flexible springs, substantially as described.

2. A brush-holder having adjacent brushes rigidly clamped against conducting pieces or blocks which permit them to abut against each other, leaving the sides thereof clear, in combination with means for imparting a parallel motion thereto, substantially as shown and described.

3. A brush-holder having adjacent brushes rigidly clamped against conducting pieces or blocks in such manner as to permit them to abut against each other laterally and provided with means for imparting a parallel motion thereto without the use of sliding contacts, substantially as described.

4. A brush-holder consisting of an arm or stud adjustably secured to a rocker-arm, in combination with a pair of brushes located side by side and resting against each other, together with a pair of brush-supporting springs secured at one end to the aforesaid arm or stud and at the other to contact-blocks to which the aforesaid brushes are clamped, and adjustable means connecting said springs with the aforesaid arm or stud, the arrangement being such that the brushes always bear against each other laterally and maintain a parallelism of movement during their entire life, substantially as described.

5. A brush-holder consisting of an arm or stud provided with means for giving it parallel adjustment with relation to the rocker-arm of a dynamo-electric machine, in combination with brush-supporting springs secured thereto; contact-plates secured to the free ends of said springs and adapted to grip or hold the brush by its opposite faces only and in such manner that all the other faces are left free or exposed, together with means for varying the pressure of the brush upon the commutator, substantially as described.

6. A commutator-brush of substantially rectangular form provided with an opening or slot through the body thereof and clamps on its front and rear faces, in combination with a screw or bolt extending through said slot so as to firmly secure the brush between the clamps, one of said clamps being connected by flexible means to a stud or arm which in turn is provided with means for giving it parallel adjustment with relation to the rocker-arm of a motor or dynamo-electric machine, substantially as described.

In testimony whereof I have hereunto subscribed my name this 3d day of February, 1898.

ROBERT LUNDELL.

Witnesses:
C. J. KINTNER,
M. M. ROBINSON.